(12) United States Patent
Baudry et al.

(10) Patent No.: US 7,804,978 B2
(45) Date of Patent: Sep. 28, 2010

(54) METHOD AND DEVICE FOR READING DIGITAL WATERMARK, COMPUTER SOFTWARE PACKAGE AND CORRESPONDING STORAGE MEANS

(75) Inventors: Séverine Baudry, Rennes (FR); Philippe Nguyen, Rennes (FR)

(73) Assignee: Thomson Licensing, Boulogne-Billancourt (FR)

( * ) Notice: Subject to any disclaimer, the term of this patent is extended or adjusted under 35 U.S.C. 154(b) by 855 days.

(21) Appl. No.: 11/663,796

(22) PCT Filed: Oct. 7, 2005

(86) PCT No.: PCT/FR2005/002483

§ 371 (c)(1),
(2), (4) Date: Mar. 26, 2007

(87) PCT Pub. No.: WO2006/037899

PCT Pub. Date: Apr. 13, 2006

(65) Prior Publication Data

US 2009/0123020 A1    May 14, 2009

(30) Foreign Application Priority Data

Oct. 7, 2004    (FR) ................... 04 10605

(51) Int. Cl.
*G06K 9/00* (2006.01)
*H04L 9/32* (2006.01)
(52) U.S. Cl. .................. 382/100; 382/235; 713/176
(58) Field of Classification Search .......... 382/100, 382/103, 123, 168, 181–183, 232, 235–239, 382/254, 274, 276, 282, 290–295, 305, 312; 713/176; 370/468
See application file for complete search history.

(56) References Cited

U.S. PATENT DOCUMENTS 6,671,388 B1 * 12/2003 Op De Beeck et al. ...... 382/100

(Continued)

FOREIGN PATENT DOCUMENTS

WO    WO 00/65840    11/2000

OTHER PUBLICATIONS

S. Baudry et al: "Channel coding in video watermarking: use of soft decoding to improve the watermark retrieval" Proceedings International Conference on Image Processing, Piscataway, NJ USA, IEEE, vol. 3, Sep. 10, 2000, pp. 25-28.

(Continued)

*Primary Examiner*—Seyed Azarian
(74) *Attorney, Agent, or Firm*—Robert D. Shedd; Jeffrey M. Navon (57) ABSTRACT

The invention relates to a method of reading a watermark, of the type comprising a step of determining at least one watermarking message contained in a data set, possibly preceded by a step of determining at least one suite of parameters of a watermarking channel undergone by the data set, each suite of channel parameters comprising at least one channel parameter. The step of determining at least one watermarking message and/or the prior step of determining at least one suite of channel parameters comprises (comprise): an estimation phase, consisting in processing at least one batch of data comprising data of the data set, so as to obtain N estimated element(s), with $N \geq 0$; and a verification phase, consisting in validating or invalidating, in view of the entirety or of at least a subset of the data set, each estimated element. In the foregoing, each estimated element is an estimated watermarking message, in the case of the step of determining at least one watermarking message, and a suite of estimated-channel parameters, in the case of the prior step of determining at least one suite of channel parameters.

15 Claims, 3 Drawing Sheets

U.S. PATENT DOCUMENTS

| | | | |
|---|---|---|---|
| 7,007,166 B1 * | 2/2006 | Moskowitz et al. | 713/176 |
| 7,058,979 B1 | 6/2006 | Baudry et al. | |
| 7,362,775 B1 * | 4/2008 | Moskowitz | 370/468 |
| 7,369,677 B2 * | 5/2008 | Petrovic et al. | 382/100 |
| 7,447,907 B2 * | 11/2008 | Hart et al. | 713/176 |
| 7,616,776 B2 * | 11/2009 | Petrovic et al. | 382/100 |

OTHER PUBLICATIONS

Yongjian Hu et al: "The design and application of DWT-domain optimum decoders" Digital Watermarking. First International Workshop, IWDW 2002, Revised Papers (Lecture Notes Computer Science vol. 2613) Springer-Verlag Berlin, Germany, 2003, pp. 22-30.

S. Baudry et al.: "Optimal decoding for watermarks subject to geometrical attacks", Signal Processing. Image Communication, Elsevier Science Publishers, Amsterdam, NL, vol. 18, No. 4, Apr. 2003, pp. 297-307.

Search Report Dated Jan. 24, 2006.

* cited by examiner

METHOD AND DEVICE FOR READING DIGITAL WATERMARK, COMPUTER SOFTWARE PACKAGE AND CORRESPONDING STORAGE MEANS

This application claims the benefit, under 35 U.S.C. §365 of International Application PCT/FR05/02483, filed Oct. 7, 2005, which was published in accordance with PCT Article 21(2) on Apr. 13, 2006 in French and which claims the benefit of French patent application No. 0410605, filed Oct. 7, 2004.

1. FIELD OF THE INVENTION 1.1 Context of the Invention

The invention lies in the field of digital video watermarking.

More precisely, the invention relates to a method of reading a watermark.

The invention has numerous applications, such as for example the reading of watermarks on video file (of MPEG 2 type for example). It allows for example protection against film piracy by screen copying ("DVD screeners"), that is to say by illegal recording by filming a cinema screen.

More generally, the present invention can apply in all cases where the data to be processed can be stored over a certain depth, so as to be able to rewind during the processing of these data.

The invention can be applied to any type of support data (video, image, audio, text, 3D data, etc.).

Moreover, the invention applies whatever the format of the support data: in the form of a stream (for example a video signal picked up on a television channel), in the form of a file, in the form of a recording (cassette, DVD, etc.), etc.

Simply for the sake of simplification, and for the reader's proper understanding, the context of the invention is explained hereafter in greater detail taking by way of example the case of a sequence of data of video type. It is recalled that the invention can however be applied to any type of data set.

The reading of the watermark can be rendered difficult by the alterations undergone by the watermarked video. The compressions at low bitrate (MPEG 2) or very low bitrate (DivX, WindowsMedia) thus generally very strongly degrade the quality of the watermarking signal. The geometric deformations (shift and splitting, change of scale, etc.) can render the watermark unreadable if a prior step of registration of the image in the original reference frame is not undertaken.

In the application of protection against the piracy of screen copies ("screeners"), each DVD is watermarked with a different number, uniquely identifying each recipient. If piracy is subsequently noted (transmission of the film on the Internet, resale of the DVD on auction sites), it is then possible to identify the source thereof and to institute proceedings. For this purpose, it is necessary that the watermark be robust to manipulations of the video (typically low bitrate DivX encoding for transmission on the Internet), and especially that it is possible to read it out with the maximum reliability (so as not to accuse anyone wrongly).

1.2 Reminder of the Generic Principles of Watermarking Systems

Figure 1:
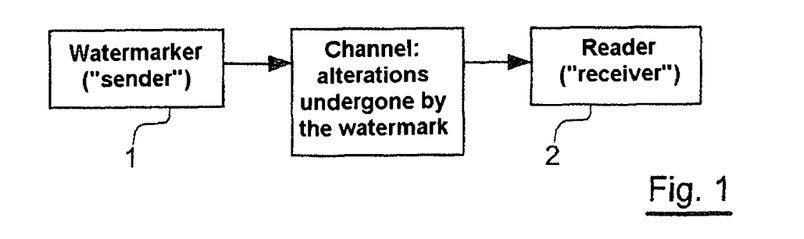
FIG. 1 presents a generic diagram of a watermarking system.

A watermarking system is an information transmission system. As illustrated in FIG. 1, it therefore comprises (at least) a sender 1 (the "watermarker" proper), which modifies a support video so as to insert the watermarking message, and (at least) a receiver ("watermark reader") 2, which on receipt of an arbitrary video determines whether the latter is watermarked and, if it is, which is the inserted message.

Figure 2:
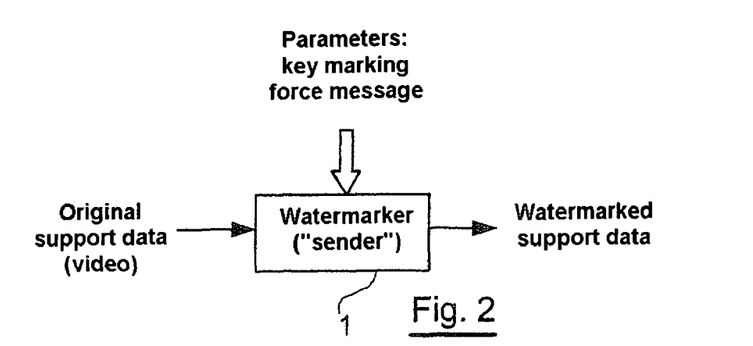
FIG. 2 presents a generic diagram of the operation of a watermarker appearing in FIG. 1.

As illustrated in FIG. 2, the sender (watermarker) 1 takes as input a "support" data set (typically video data) and a certain number of parameters. The watermarking message (also called "carrier watermark"), which is represented by a series of M binary elements ($M \geq 1$), generally features in particular among the parameters. Generally, other parameters are also found, like the key which ensures a certain safety level, the marking force, etc. As a function of these parameters and of the video itself, the watermarker modifies the video to produce a watermarked video.

Figure 3:
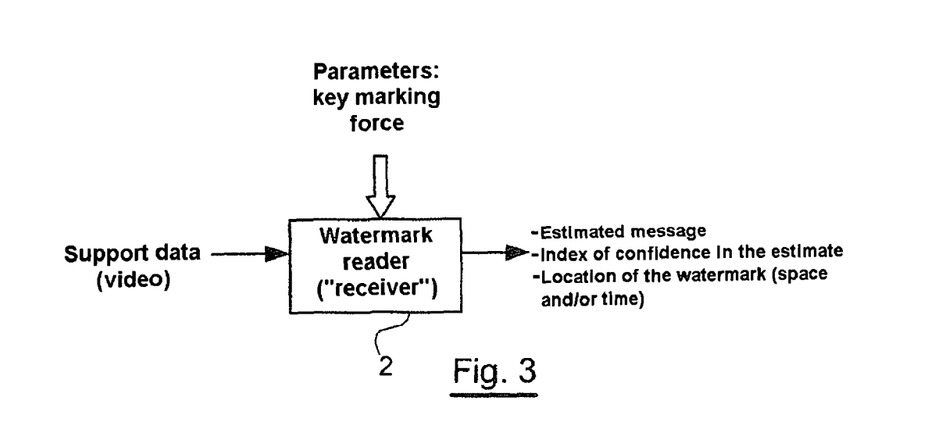
FIG. 3 presents a generic diagram of the operation of a watermark reader appearing in FIG. 1.

As illustrated in FIG. 3, the receiver (watermark reader) 2 takes as input a video, as well as possibly a certain number of parameters (for example a key). Optionally, it also takes as input the original video, which can serve to facilitate the determination of the channel parameters, by comparison between the original video and the tested video (video on which one seeks to read out the watermark). The original video can also be used to facilitate the reading of the watermarking message: for example the subtraction of the original from the tested video makes it possible to reduce the impact of the noise affecting the watermark, in particular of the noise produced by the original video itself. On the basis of these data it generally carries out a step of detection, which determines whether the video is or is not watermarked. If the detection is positive, it carries out a step of determination (or decoding) of the watermarking message or messages (it is possible to have several watermarking messages if the support data arise from an operation of compositing, for example montage of several video sequences, averaging of images, production of a montage or of a mosaic with the aid of several support data, etc.). The watermarking messages detected are possibly accompanied by auxiliary information: for example a reliability index (estimation of the probability that the estimated watermarking message is erroneous), information regarding location of the watermark (temporal and/or spatial location, in the cases of compositing). Note that all the steps included in the reading process can be performed either directly on the video data itself, or on a transformed representation of the data (Fourier Transform, discrete cosine transform—DCT-, wavelet transform, etc.).

Location of the watermark is useful, or even indispensable. Specifically, the watermark is generally of interest only by being associated with support data, for example to make it possible to identify a transmitted extract. When several watermarking messages are retrieved on one and the same support data set, it is therefore important to know as precisely as possible to which subset of support data each of the watermarking messages corresponds.

We now introduce the concept of watermarking channel. Between the watermarker 1 and the reader 2, the support data (video) generally undergo a whole series of transformations. These transformations are related to the technical contingencies of the life of the image (transmission, storage, utilization, etc.), but also to possible intentional attacks aimed at rendering the watermark unusable. By analogy with the field of transmissions, all the modifications undergone by the watermarking signal are named "watermarking channel" on account of the modifications of the support data. These modifications can produce an alteration ("noise") of the watermarking signal and therefore render reading more difficult and/or prone to errors.

Among the alterations due to the watermarking channel, let us cite the most frequent (nonexhaustive list):
loss compression (JPEG, MPEG, divX, etc.), having all the more harmful an effect the higher the compression rate;
geometric transformations: shift and splitting, change of scale, deformations, etc.;

temporal transformations: remontage, cutoffs, change of image frequency (PAL/NTSC standards);

temporal and/or spatial compositing;

colorimetric or luminance transformations.

The modifications produced by the watermarking channel are generally unknown ("random") during the reading of the watermark. So that these modifications do not engender any read error or inability to read, two principal families of strategies are possible:

during the watermarking process, contrive matters so that the watermarking signal (or some of its characteristics) is intrinsically invariant after entry into the watermarking channel (choice of the modulation technique, redundant coding, etc.);

during the reading of the watermark, previously estimate the value of the alterations produced by the watermarking channel (channel parameters) so as if possible "to invert" the transformation carried out by the channel.

This second strategy is much used to estimate the parameters of the geometric transformations caused by the watermarking channel. It sometimes uses an auxiliary watermarking signal (also called "co-watermarking").

1.3 Various Parameters Estimated by the Watermark Reader

Figure 4:
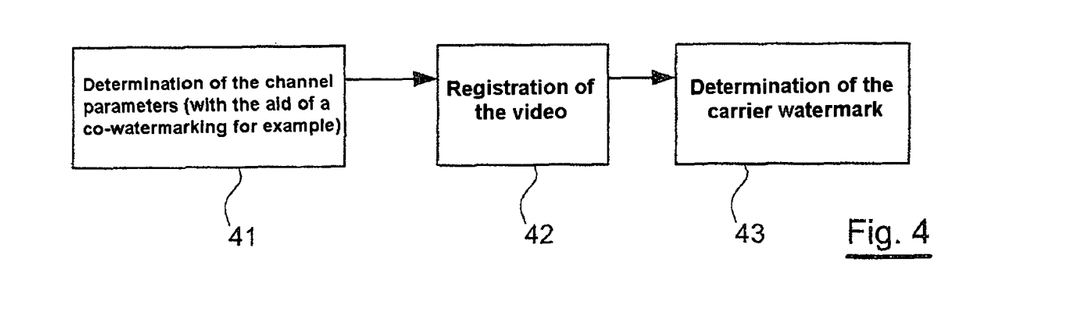
FIG. 4 presents a generic diagram of a watermark reading process.

As illustrated in FIG. 4, the reading process generally proceeds in three main steps:

a step (41) of determining some of the channel parameters (typically geometric deformations), possibly by using a co-watermarking signal;

a step (42) of registering the video: on the basis of the previously estimated channel parameters, the transformation corresponding to the watermarking channel is estimated, then this estimated transformation is inverted (if possible) and finally the "inverse estimated transformation" is applied to the test video;

a step (43) of determining the watermarking message on the registered test video.

The co-watermarking signal (also named reference signal or watermark, synchronization signal, auxiliary signal, training signal, service signal) is inserted by the watermarker 1. It is known to the reader 2 and makes it possible to estimate certain alterations (channel parameters) undergone by the video. Note however that it is possible to design systems dispensing with synchronization watermarking, either because the step (41) of estimating the alterations is not performed (this is not necessary in certain applications), or because the step (41) of estimating the alterations does not use any auxiliary watermark.

2. PRIOR ART 2.1 Known Techniques of Digital Watermarking

A first known technique of digital watermarking is described in the following article: S. Baudry, J. F. Delaigle, B. Sankur, B. Macq, H. Maitre, "Analyses of error correction strategies for typical communication channels in watermarking", pp 1239-1250 in Signal Processing, Vol 81, No 6, June 2001.

In this article a procedure for coding and decoding the carrier watermarking signal in an image or a video is proposed. A corrector code is used, formed by concatenation of a BCH code and of a repetition code. A flexible decoding procedure is proposed, which makes it possible to increase the detection performance with respect to a conventional firm decoding. However, the decoding is carried out image by image and does not take into account the globality of the video.

A second known technique of digital watermarking is described in the following article: J. P. M. G. Linnartz, A. A. C. Kalker, J. Haitsma, "Detecting electronic watermarks in digital video", Paper 3010, Invited paper for special session at ICCASP '99, Phoenix, Ariz., March 1999.

The authors propose here a procedure for detecting watermark of additive type (spectrum spreading). It makes it possible to control the false alarm rate (watermark detected on a nonmarked image) at the same time as the detection rate. However, the watermarked message contains only 1 bit: reading consists simply in determining whether the watermark is present or absent. If a message with a significant number of bits is inserted, the procedure is no longer suitable since it requires an excessive number of operations (see below the considerations on exhaustive decoding).

A third known technique of digital watermarking is described in the following article: Y. Zhao, R. Lagendijk, "video watermarking scheme resistant to geometric attacks, proceedings of ICIP, vol. 2, Rochester, N.Y., p. 145-149, September 2002.

The authors propose a video watermarking procedure relying on a temporal modulation of the average luminance of the images of the sequence. The benefit of this procedure is that it is robust to the geometric transformations operating on the images. On the other hand, it allows only a watermark of low information density (a few bits per minute) to be buried. Moreover, if the sequence is uploaded, or if it undergoes an attack by collusion (several users merge their watermarked sequences with different messages in the hope of scrambling the watermarks), the proposed detection procedure does not make it possible to decode the watermark correctly.

A fourth known technique of digital watermarking is described in American U.S. Pat. No. 6,516,079, entitled "Digital watermarking screening and detecting strategies".

This patent U.S. Pat. No. 6,516,079 describes a method of detecting watermark in two or more steps. Each step consists of the measurement of probabilities of presence ("detection value") calculated in different ways. In particular, the authors propose two types of measurements: one absolute, consists of the comparison of a detection score (correlation) with respect to a threshold; the other, relative, consists of the comparison of the largest absolute score with respect to the other scores. Each step makes it possible to reject more and more portions of the signal as nonwatermarked (or even to reject the entirety of the signal if appropriate). It is therefore aimed at rendering the reading of the watermark faster by rapidly rejecting certain portions considered to be nonwatermarked, so as to concentrate the calculation resources on other portions considered to be potentially watermarked.

2.2 Reminders on Exhaustive Decoding and Incomplete Decoding

As the watermarking channel is noisy and induces errors in the watermarking signal, the watermarking message is generally encoded by using an error corrector code. On the basis of k message bits, such a code provides a word of n bits (n>k). The set of words of n bits obtained on the basis of the coding of all the possible words of k bits is called the code (the set of code words). As n>k, not all the words of n bits belong to the code.

During decoding, an n-bit word is received. The latter is not necessarily a code word (certain bits may have been modified because of the channel errors). It is possible to show that, for most "realistic" channels, the optimal decoding (which produces the minimum probability of decoding error) is MAP (Maximum A Posteriori) decoding. A MAP decoding searches, among the set of code words, for that which is the closest within the sense of the Hamming distance to the word received. It is recalled that the Hamming distance between 2 words m1 and m2 is the number of different bits between these words m1 and m2. The reliability of the decoding may then be given as a function of the Hamming distance between received word and decoded word.

It is possible to implement a MAP decoding simply by carrying out an exhaustive decoding. For this purpose, the set of code words is generated ($2^k$ possible words), then, for each of the code words, its Hamming distance to the word received is calculated. The decoded word is then the code word whose distance to the word received is minimum.

However, such an algorithm is not used in practice since it leads to extremely long calculation times as soon as k exceeds about ten bits. For example, for a code with k=64 (typical order of magnitude for watermarking applications), there are about $1.8 \ 10^{19}$ code words. The number of operations required to effect an exhaustive decoding increases exponentially with k. If the problem is considered from the statistics viewpoint, to effect an exhaustive decoding is equivalent to performing a test with $2^k$ hypotheses (or $2^k+1$ hypotheses, if the null hypothesis is included: "nonwatermarked video").

Faster decoding algorithms than exhaustive decoding have therefore been proposed. Unfortunately, for most corrector codes, these algorithms are incomplete. This signifies that they make it possible to find the word closest to a given received word, but only under certain conditions. For most corrector codes, the decoding algorithm only provides the closest word if the distance between received word and code word is less than a given distance $d_{min}$. The effect of this is that the detection rate is lower than for exhaustive decoding, in particular when the error rate of the channel is high (this often being the case in watermarking applications).

Figure 5:
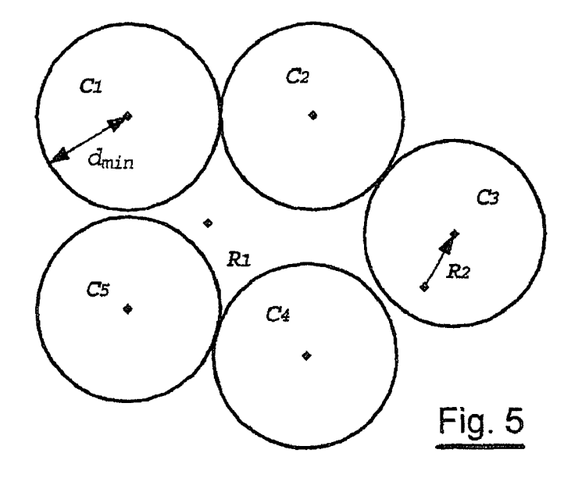
FIG. 5 is a geometric representation of an incomplete watermark decoding.

FIG. 5 is a geometric representation of an incomplete watermark decoding. The decoding regions are spheres of radius $d_{min}$, each centered on a distinct code word $C_i$. The received word $R_2$ is situated in a decoding sphere, it can therefore be decoded at $C_3$. On the other hand, the received word $R_1$ is situated outside the decoding regions and therefore cannot be decoded. In practice, the density of the decoding spheres with respect to the set of possible words is very low. This signifies that, for a random word, the decoding has very little chance of succeeding. If the channel is very noisy, the rate of decoding of the watermark will also be very low.

3. OBJECTIVES OF THE INVENTION

The objective of the invention is in particular to alleviate these various drawbacks of the state of the art.

More precisely, one of the objectives of the present invention, in at least one embodiment, is to provide a technique for reading a watermark which combines the advantages of exhaustive decoding and of incomplete decoding, while alleviating their respective drawbacks.

Stated otherwise, in at least one embodiment of the invention, it involves obtaining a faster technique for reading a watermark than a conventional method based on exhaustive decoding, while making it possible to obtain higher detection rates and to reduce the error rates with respect to a conventional method based on incomplete decoding.

The objective of the invention is also, in at least one embodiment, to provide such a technique making it possible to easily obtain a measure of reliability of the decoding performed.

Another objective of the invention, in at least one embodiment, is to provide such a technique making it possible to obtain, in addition to the value of the watermarking message or messages, complementary information which may be indispensable in certain applications: typically evaluation of the reliability of the watermark read out, location of this watermark in the support data.

A complementary objective of the invention, in at least one embodiment, is to provide such a technique making it possible to economize on the memory space necessary for its implementation in the watermark reader.

4. ESSENTIAL CHARACTERISTICS OF THE INVENTION

These various objectives, as well as others which will appear subsequently, are achieved according to the invention with the aid of a method of reading a watermark, of the type comprising a step of determining at least one watermarking message contained in a data set, possibly preceded by a step of determining at least one suite of parameters of a watermarking channel undergone by said data set, each suite of channel parameters comprising at least one channel parameter. Said step of determining at least one watermarking message and/or said prior step of determining at least one suite of channel parameters comprises (comprise):

an estimation phase, consisting in processing at least one batch of data comprising data of said data set, so as to obtain N estimated element(s), with $N \geq 0$; and a verification phase, consisting in validating or invalidating, in view of the entirety or of at least a subset of said data set, each estimated element;

where each estimated element is an estimated watermarking message, in the case of said step of determining at least one watermarking message, and a suite of estimated-channel parameters, in the case of said prior step of determining at least one suite of channel parameters.

Thus, the invention makes it possible to improve the performance of at least one of the two steps of determination conventionally included in a method of reading a watermark, namely (cf. FIG. 4): step (41) of determining at least one channel parameter and step (43) of determining at least one watermarking message.

More precisely, the general principle of the invention consists in replacing in one and/or the other of these two steps of determination (41, 43), a conventional processing mechanism, carried out in a single pass and pertaining to the entirety of the data, by a new and inventive processing mechanism, carried out in two successive phases: first of all an estimation phase pertaining solely to one or more data batches of the data set, then a verification phase pertaining to the entirety or one or more subsets of the data of the data set.

The invention brings to the fore the similarities between the determination of the channel parameters and the reading of the watermarking messages. Specifically, during the reading of the watermarking message or messages, one seeks to estimate the "parameters" of the watermarking system ("sender"), that are the watermarking messages themselves.

In a general way, the invention can also be seen as an adaptation of a method of decoding of a watermark and/or of estimating channel parameters "on the fly" (that is to say suited to real-time reading), to a non real-time context (unless very effective processing means are available) where it is possible to allow oneself "rewinds".

In a particular embodiment of the invention, each batch of data comprises only a part of said data set.

The method of reading a watermark according to the invention is all the faster the smaller the size of each batch of data.

In an advantageous manner, said estimation phase consists in processing at least two data batches, so as to obtain Ni estimated element(s) for each batch of data, with Ni≧0.

By increasing the number of data batches, the probability of processing an unaltered (or hardly altered) part of the data set, and therefore of correctly estimating a suite of channel parameters or a watermarking message on the basis of this part of the data set, is increased. Specifically, the various parts of the data set are altered in an unequal manner.

Advantageously, said data set is a sequence of data of video type comprising a plurality of successive images, and in that each batch of data belongs to the group comprising:
- batches each consisting of an image portion;
- batches each consisting of an image;
- batches each consisting of a group of images.

In an advantageous embodiment of the invention, said verification phase comprises the following steps, for each estimated element:
- splitting of the entirety or of a part of said data set into one or more data subsets;
- for each of the subsets:
  - calculation of the a posteriori probability of said estimated element, conditionally on said subset;
  - comparison of said a posteriori probability, calculated conditionally on said subset, with a first predetermined threshold;
  - if the a posteriori probability, calculated conditionally on the subset, is greater than said first predetermined threshold, validation of the element estimated for the corresponding subset, otherwise invalidation of the element estimated for the corresponding subset.

It will be noted that the a posteriori probability of an estimated element constitutes a measure of reliability of the decoding performed (that is to say of the estimation of this element, suite of channel parameters or watermarking message).

Advantageously, said step of calculating the a posteriori probability of said element estimated conditionally on a given subset comprises the following steps:
- intermediate calculation of the a posteriori probability of said element, conditionally on at least two sub-portions together forming said subset;
- combination of the results obtained on completion of said step of intermediate calculation, for said at least two sub-portions, so as to obtain said a posteriori probability of said element estimated conditionally on the entirety of said subset.

In an advantageous manner, said verification phase makes it possible to locate each element estimated on each subset for which said estimated element is validated.

In an advantageous manner, said data set is a sequence of data of video type comprising a plurality of successive images, and in that each subsequence comprises one or more images.

For example, said data set belongs to the group comprising:
- data sets of video type;
- data sets of image type;
- data sets of audio type;
- data sets of text type;
- data sets of 3D data type.

Advantageously, said estimation phase and/or said verification phase also allows (allow) a reliability measure to be obtained associated with at least one estimated element.

In an advantageous embodiment of the invention, the method furthermore comprises a step of registering said data set as a registered data set, said registration step being executed for at least certain suite(s) of channel parameters determined in the course of said step of determining at least one suite of channel parameters. Furthermore, said step of determining at least one watermarking message is implemented with each registered data set resulting from a different execution of said registration step.

In an advantageous manner, said registration step is executed only for the suite(s) of channel parameters estimated of which an associated reliability measure is greater than a second predetermined threshold.

The invention also relates to a device for reading a watermark, of the type comprising a module for determining at least one watermarking message contained in a data set, and possibly a module for determining at least one suite of parameters of a watermarking channel undergone by said data set, each suite of channel parameters comprising at least one channel parameter. Said module for determining at least one watermarking message and/or said module for determining at least one suite of channel parameters comprises (comprise):
- estimation means, performing a processing of at least one batch of data comprising data of said data set, so as to obtain N estimated element(s), with N≧0; and
- verification means, performing a validation or an invalidation, in view of the entirety or of at least a subset of said data set, of each estimated element;

where each estimated element is an estimated watermarking message, in the case of the module for determining at least one watermarking message, and a suite of estimated-channel parameters, in the case of the module for determining at least one suite of channel parameters.

The invention also relates to a computer program product, comprising program code instructions for the execution of the steps of the method according to the aforesaid invention, when said program is executed on a computer.

The invention further relates to a storage means, possibly totally or partially removable, readable by a computer, storing a suite of instructions executable by said computer for implementing the aforesaid method according to the invention.

5. LIST OF FIGURES

Other characteristics and advantages of the invention will appear on reading the following description of a preferential embodiment of the invention, given by way of indicative and non limiting example, and of the appended drawings, in which.

6. DESCRIPTION OF AN EMBODIMENT OF THE INVENTION

FIGS. 1 to 5 relate to the field and to the technical context of the present invention. They have already been described above and are therefore not described again.

FIGS. 6 to 9 are specific to the present invention. They are described in a detailed manner hereafter.

Subsequently in the description, the case of a data set of video type is taken by way of example. It is recalled that the invention can however be applied to any type of data set (image, audio, text, 3D data, etc.).

Figure 6:
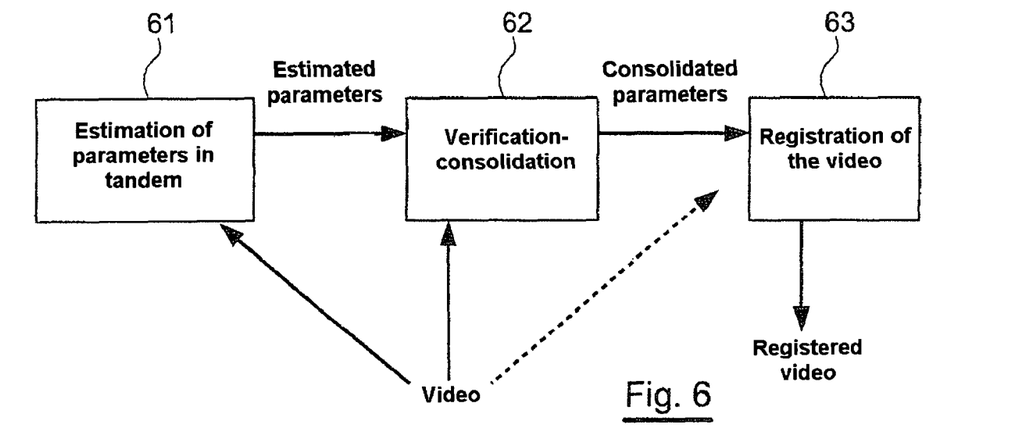
FIG. 6 illustrates the principle of the two-phase generic processing mechanism according to the invention (an estimation phase then a verification phase), being able to be implemented in a method of reading a watermark, and more precisely in the step of determining at least one channel parameter and/or in the step of determining at least one watermarking message.

The two-phase generic processing mechanism according to the invention, which comprises a phase 61 of estimating the best candidates, followed by a phase 62 of verifying the best estimated candidates, is presented now in conjunction with FIG. 6. This mechanism according to the invention can be implemented in a method of reading a watermark. Stated otherwise, the invention applies to the "reader" part of a watermarking system, that it renders more effective.

More precisely, the mechanism according to the invention can be implemented:
- in the step of determining at least one channel parameter (step performed by the co-watermark reader (auxiliary synchronization signal) or by means implementing another technique not using any auxiliary synchronization signal); and/or
- in the step of determining at least one watermarking message (step performed by the carrier watermark reader).

In the estimation phase 61 (first phase), the desired parameters (also called elements) are estimated on the basis of the video. In the case of the carrier watermark, these parameters (or elements) are the watermarking messages (parameters of the watermarker). In the case of the determination of the channel parameters, they are the channel parameters themselves (for example the parameters of the geometric transformation). The parameters (or elements) estimated during this estimation phase 61 will be the a priori parameters of the verification phase 62.

In the verification phase 62 (second phase), on the basis of the video, the set of a priori parameters arising from the preceding phase 61 is consolidated and validated. During this verification phase 62, it is also possible to calculate additional information, such as for example an estimate of the reliability of the estimated parameters, or seek to locate in a more precise manner the various parameters (for example, find which precise images are associated with a given value of watermarking message). New image subsets (possibly different from the batches of the first phase) are then determined; each image subset corresponding to a watermarking value, or else to a value of a suite of channel parameters.

The mechanism according to the invention possibly comprises a registration phase 63 (third phase), only in the case of the determination of the channel parameters. In this registration phase 63, the channel parameter or parameters determined during the second phase 62 is or are applied to the entirety of the sequence or to each set of images (see the concept of subset of images in the paragraph above).

More precisely, and as has already been discussed above in conjunction with FIG. 4 (cf. step 42), the registration of the video consists in estimating the transformation corresponding to the watermarking channel on the basis of the channel parameters estimated, then in inverting this estimated transformation (if possible) and finally in applying the "inverse estimated transformation" to the video. A registered video is thus obtained, assumed to possess the same spatial and geometric parameters as before the modification by the watermarking channel. It is this registered video which is in this case used by the carrier watermark reader to perform the estimation phase 61 and verification phase 62 that are included in the step of determining at least one watermarking message.

Figure 7:
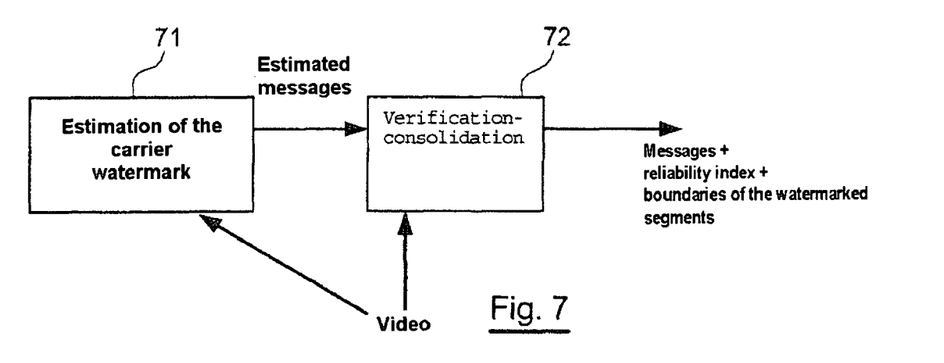
FIG. 7 illustrates the implementation of the generic mechanism of FIG. 6 in the step of determining at least one watermarking message.

An exemplary implementation of the generic mechanism of FIG. 6 in the step of determining at least one watermarking message (also called carrier watermarking) is detailed now, in conjunction with FIG. 7.

In this case, the mechanism according to the invention comprises a phase 71 of estimating the carrier watermarking values and a phase 72 of verifying the carrier watermarking values estimated during the preceding phase 71.

In the phase 71 of estimating the carrier watermarking values, a succession of decodings of the carrier watermarking is performed, each decoding taking place on a batch of images of the video. A batch of images consists either of an image, or of an image portion, or of a group of images (the number of images per group can be fixed or variable). The various image batches can be disjoint or intersect (in which case a portion of the signal can form part of two distinct batches). The decoding can be incomplete (for example if the image batches are of significant size) or exhaustive (for example if the image batches are of small size and/or if the number of possible values for the watermarking message is small). Note that the decoding can either use only the tested video, or use the tested video and the original video. It is for example possible to subtract the original data from the tested data, so as to reduce the noise due to the interference of the original data with the watermark.

On completion of the decoding on a batch, a certain number of estimates of the value of the carrier watermarking is obtained. The number of estimates can be zero (the batch could not be successfully decoded), equal to 1, or greater than 1 (there are several possible estimates).

Each of the estimates can be accompanied by a reliability measure (for example: estimated error probability, proportion of the batch on which it is estimated that the watermarking signal is present, etc.). On completion of the first phase 71, a set of estimated values for the carrier watermarking, possibly each accompanied by a reliability measure, is therefore obtained.

In the verification phase 72, the set of values $m_i$ previously estimated for the carrier watermarking, possibly each accompanied by a reliability index, is considered. Some of these values $m_i$ may have been detected on several different batches (if for example the entirety of the video is marked with the same message, and the video has not been too greatly altered).

One seeks to confirm or deny the presence of each of these values $m_i$ on the entirety or on one or more subsequences of the video. This is equivalent to a test of presence or else to a detection, or else to a test with two hypotheses: H0, for $m_i$ absent, H1 for $m_i$ present.

For this purpose the a posteriori probability $P(m_i/r)$ of each value $m_i$ conditionally on the received signal r is calculated (r can be the entire video sequence, a single subsequence of the video, or else one of a plurality of subsequences of the video, each comprising one or more images). This probability is compared thereafter with a threshold $S_1$ determined in advance: if it is greater it is decided that a watermarking message of value $m_i$ is present (H1 is accepted), otherwise it is decided that the watermarking message of value $m_i$ is absent (H0 is accepted).

The a posteriori probability can be calculated for example by a measure of correlation between the two signals ($m_i$ and r), itself consisting for example of a measure of the Hamming distance between the two signals, possibly weighted by a measure of the reliability for each of the bits of the value $m_i$ estimated.

In a first case of calculation of probability conditionally on the entire video sequence, it is possible to calculate the a posteriori probability either globally on the entire video, or on subsequences of the video (each comprising one or more images).

In a second case of calculation of probability conditionally on a given subsequence of the video, it is possible to calculate the a posteriori probability either globally on the given subsequence, or on portions of the given subsequence (each comprising one or more images).

If intermediate calculations are performed (on subsequences of the video sequence in the first aforesaid case, or on portions of a given subsequence in the second aforesaid case, it is necessary thereafter to merge the series of measurements obtained during these intermediate calculations. It is for example possible to count the number of images on which the calculated probability is greater than a threshold $S_2$, and decide that $m_i$ is present if this number is greater than another threshold $S_3$.

The advantage of this second phase (verification phase 72) is that a detection is much faster to carry out than a decoding. There are indeed only two hypotheses to be tested for each value $m_i$ estimated (calculation of an a posteriori probability), while in the case of exhaustive decoding there were $2^k$ (calculation of $2^k$ a posteriori probabilities).

Moreover, one is sure to obtain on completion of the method a measure of reliability of the decoding obtained (a posteriori probability), while with incomplete decoding, no information was gleaned in the case where the decoding failed.

It is thus possible to reinforce the presence of a watermarking message on portions of the video where the decoding had failed during the first phase (estimation phase 71). Let us assume for example that the video was very noisy, for example following a divX low bitrate compression. Such a compression often has the effect of altering in an unequal manner the various portions of the video. It may happen therefore that the watermarking message is decodable only fleetingly, over a few images of the sequence. In the other images, the watermark is always present, but too noisy to be decoded directly (it may for example be located at the outer limit of the decoding spheres of FIG. 5). On the other hand, a detection test applied to these images during the second phase 72, knowing the watermarking message $m_i$ estimated during the first phase 71, will without doubt give a positive result, and this will be all the truer the larger the number of images considered. The second phase 72 will therefore allow better locating of the portions of the sequence on which the watermarking message $m_i$ is present.

The second phase 72 also presents the advantage of reducing the risks of decoding error. If indeed an erroneous watermarking value $m_e$ is decoded during the first phase 71, it is most improbable that this value is found again "by chance" in the remainder of the video. There will therefore be a very low a posteriori probability of $m_e$ over the major part of the video. The erroneous message will therefore be eliminated on completion of the second phase 72.

Figure 8:
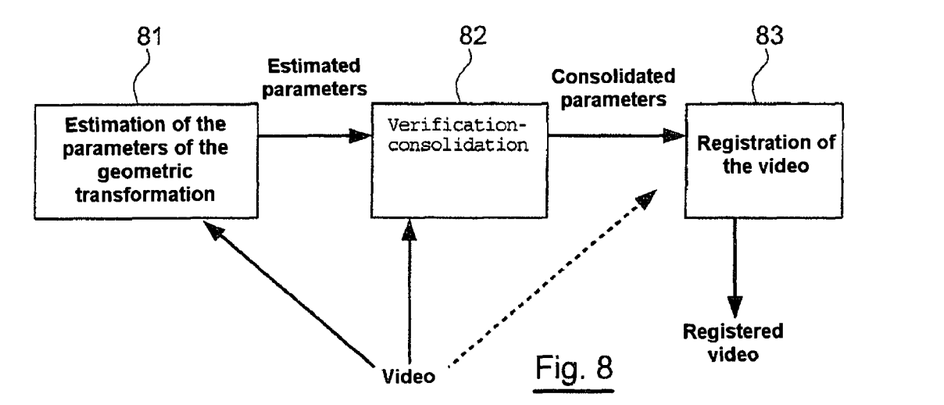
FIG. 8 illustrates the implementation of the generic mechanism of FIG. 6 in the step of determining at least one channel parameter.

An exemplary implementation of the generic mechanism of FIG. 6 in the step of determining at least one watermarking channel parameter is detailed now, in conjunction with FIG. 8.

In this case, the mechanism according to the invention comprises a phase 81 of estimating at least one suite of channel watermarking parameters and a phase 82 of verifying the suites of channel parameters estimated during the preceding phase 81.

The phases 81 and 82 for the calculation of the channel parameters will be described more simply than the phases 71 and 72 for the calculation of the watermarking messages (see FIG. 7), since they are in large part similar to them.

In the phase 81 of estimating the values of the channel parameters, each batch of images of the video is processed, and a certain number of suites of estimated parameters is obtained, each possibly accompanied by a reliability measure.

As already indicated above, the channel parameters can be estimated either on the basis of a co-watermarking signal, or by other techniques not using any auxiliary synchronization signal. It is for example possible to use the original video in addition to the tested video, so as by comparison between the two to determine the parameters of the channel. For example, if the channel consists of a translation of the images of unknown parameter, it is possible to determine this translation by calculating the cross-correlation between the images of the original video and the images of the tested video. The position of the cross-correlation maximum will give the value of the translation carried out by the channel.

The phase 81 of estimating the channel parameters can be automatic, or else be carried out manually, for example by registering the original sequence and the sequence on which one seeks to read out the watermark.

The phase 82 of verifying the suites of estimated channel parameters is similar to the phase 72 (FIG. 7) of verifying the carrier watermarking values estimated.

Optionally, it is furthermore possible to take account in the present second phase 82 of the a priori hypotheses on the evolution of the channel parameters. For example, it is possible to consider that the geometric transformations vary "very slowly" on the scale of the video (otherwise an unpleasant "shift" effect would be observed). In the extreme, if it is considered that the geometric transformation is fixed throughout the video, then the parameters whose reliability appears maximum will be selected. This suite of parameters is then applied to the entirety of the video.

The reliability measure obtained for each suite of parameters in the second phase 82 (or, in a variant, in the first phase 81) can be used during the following step of estimating/verifying the carrier watermarking (phases referenced 71 and 72 in FIG. 7). It is thus possible to register the video (registration phase 83, equivalent to the registration phase 63 of FIG. 6), by "trying" each of the various suites of parameters estimated (with the proviso that their reliability is considered to be sufficient). Stated otherwise, several registered videos are thus made available and the following step of estimating 71/verifying 72 the carrier watermarking is performed with of each of them. A tolerance is therefore introduced, which makes it possible to reduce the impact of a bad estimation of the channel parameters on the estimation of the carrier watermarking.

Figure 9:
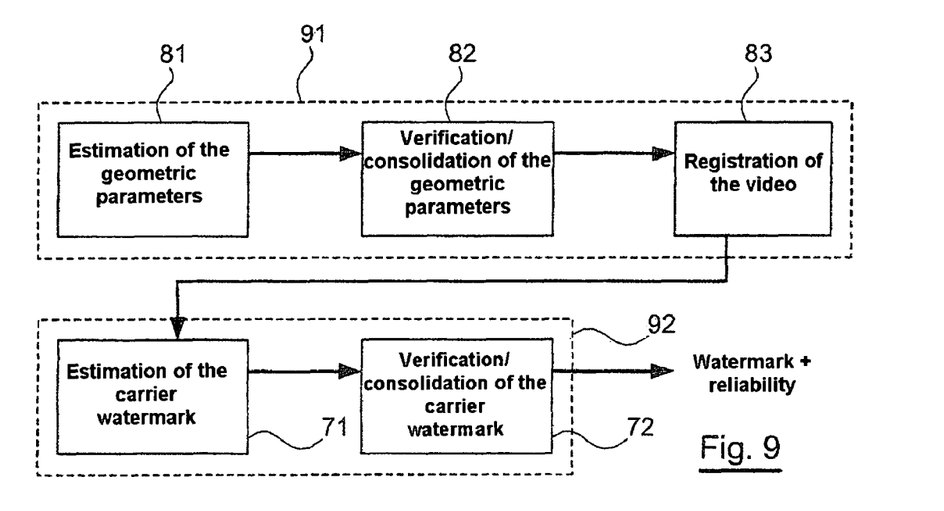
FIG. 9 illustrates a particular embodiment of the invention, in which the generic mechanism of FIG. 6 is implemented in the step of determining at least one channel parameter and also in the step of determining at least one watermarking message.

FIG. 9 illustrates a particular embodiment (already mentioned above) of the invention, in which the generic mechanism of FIG. 6 is implemented at one and the same time in the step of determining at least one channel parameter and in the step of determining at least one watermarking message.

In this particular embodiment of the invention, the method of reading a watermark then comprises:
- a step 91 of determining at least one channel parameter, of the type presented above in conjunction with FIG. 8 and therefore comprising itself:
  - a phase 81 of estimating at least one suite of watermarking channel parameters, and
  - a phase 82 of verifying the suites of channel parameters estimated during the preceding phase 81;
- a step 92 of determining at least one watermarking message, of the type presented above in conjunction with FIG. 7 and therefore comprising itself:
  - a phase 71 of estimation of at least one carrier watermarking value, and
  - a phase 72 of verifying the carrier watermarking values estimated during the preceding phase 71.

In summary, the present invention presents numerous advantages with respect to the prior art.

Specifically, it combines the advantages of a complete decoding and those of an incomplete decoding, while alleviating their respective drawbacks:
- with respect to a complete decoding, the invention is much faster (in particular with respect to the second known technique described above);
- with respect to an incomplete decoding, the invention makes it possible to obtain higher detection rates and to reduce the error rates (in particular with respect to the first and fourth known techniques described above). It also makes it possible to obtain more easily a measure of reliability of the decoding performed.

With respect to the third technique, the invention makes it possible to estimate the watermarking messages even if the video has been uploaded or composited. It is more general than the third technique and can apply to any watermarking technique.

The invention also makes it possible to obtain, in addition to the value of the watermarked message or messages, complementary information which may be indispensable in certain applications: typically evaluation of the reliability of the watermark read out, location of this watermark in the support data.

The invention also makes it possible to economize on memory space, if only batches of images and not the entire video are considered during the first phase 71, 81. Thereafter, the information necessary for processing the second phase 72, 82 (list of estimated parameters) is of reduced size.

The present invention can be used in all watermarking applications requiring great reliability of the value read and/or of the calculation of the watermarking channel parameters (in particular the spatial deformation parameters):
- tracing of the supports on transmission networks;
- identification of the destinations of copies of the support;
- audience measurement;
- quality of the service of provision of the support;
- transport of meta-data or of dynamic information in the supports;
- etc.

Although the invention has been described above in conjunction with a particular embodiment, the person skilled in the art, on reading the present description, will understand that other embodiments can be contemplated without departing from the scope of the present invention. Consequently, the scope of the invention is limited only by the appended claims.

The invention claimed is:

1. A method of reading a watermark, of the type comprising a step of determining, by a processor, at least one watermarking message contained in a data set, possibly preceded by a step of determining at least one suite of parameters of a watermarking channel undergone by said data set, each suite of channel parameters comprising at least one channel parameter, wherein said step of determining at least one watermarking message and said prior step of determining at least one suite of channel parameters comprises (comprise):
   - an estimation phase, consisting in processing at least one batch of data comprising data of said data set, so as to obtain N estimated element(s), with $N \geq 0$; and
   - a verification phase, consisting in validating or invalidating, in view of the entirety or of at least a subset of said data set, each estimated element;
   - where each estimated element is an estimated watermarking message, in the case of said step of determining at least one watermarking message, and a suite of estimated-channel parameters, in the case of said prior step of determining at least one suite of channel parameters.

2. The method as claimed in claim 1, wherein each batch of data comprises only a part of said data set.

3. The method as claimed in claim 1, wherein said estimation phase consists in processing at least two data batches, so as to obtain Ni estimated element(s) for each batch of data, with $Ni \geq 0$.

4. The method as claimed in claim 1, wherein said data set is a sequence of data of video type comprising a plurality of successive images, and in that each batch of data belongs to the group comprising:
   - batches each consisting of an image portion;
   - batches each consisting of an image;
   - batches each consisting of a group of images.

5. The method as claimed in claim 1, wherein said verification phase comprises the following steps, for each estimated element:
   - splitting of the entirety or of a part of said data set into one or more data subsets;
   - for each of the subsets:
     - calculation of the a posteriori probability of said estimated element, conditionally on said subset;
     - comparison of said a posteriori probability, calculated conditionally on said subset, with a first predetermined threshold;
     - if the a posteriori probability, calculated conditionally on the subset, is greater than said first predetermined threshold, validation of the element estimated for the corresponding subset, otherwise invalidation of the element estimated for the corresponding subset.

6. The method as claimed in claim 5, wherein said step of calculating the a posteriori probability of said element estimated conditionally on a given subset comprises the following steps:
   - intermediate calculation of the a posteriori probability of said element, conditionally on at least two sub-portions together forming said subset;
   - combination of the results obtained on completion of said step of intermediate calculation, for said at least two sub-portions, so as to obtain said a posteriori probability of said element estimated conditionally on the entirety of said subset.

7. The method as claimed in claim 1, wherein said verification phase makes it possible to locate each element estimated on each subset for which said estimated element is validated.

8. The method as claimed in claim 1, wherein said data set is a sequence of data of video type comprising a plurality of successive images, and in that each subsequence comprises one or more images.

9. The method as claimed in claim 1, wherein said data set belongs to the group comprising:
- data sets of video type;
- data sets of image type;
- data sets of audio type;
- data sets of text type;
- data sets of 3D data type.

10. The method as claimed in claim 1, wherein said estimation phase and/or said verification phase also allows (allow) a reliability measure to be obtained associated with at least one estimated element.

11. The method as claimed in claim 10, wherein said registration step is executed only for the suite(s) of channel parameters estimated of which an associated reliability measure is greater than a second predetermined threshold.

12. The method as claimed in claim 1, wherein it furthermore comprises a step of registering said data set as a registered data set, said registration step being executed for at least certain suite(s) of channel parameters determined in the course of said step of determining at least one suite of channel parameters, and in that said step of determining at least one watermarking message is implemented with each registered data set resulting from a different execution of said registration step.

13. A storage means, possibly totally or partially removable, readable by a computer, storing a suite of instructions executable by said computer for implementing the method as claimed in claim 1.

14. A device for reading a watermark, of the type comprising a module for determining at least one watermarking message contained in a data set, and possibly a module for determining at least one suite of parameters of a watermarking channel undergone by said data set, each suite of channel parameters comprising at least one channel parameter, wherein said module for determining at least one watermarking message and/or said module for determining at least one suite of channel parameters comprises (comprise):
- estimation means, performing a processing of at least one batch of data comprising data of said data set, so as to obtain N estimated element(s), with $N \geq 0$; and
- verification means, performing a validation or an invalidation, in view of the entirety or of at least a subset of said data set, of each estimated element;
- where each estimated element is an estimated watermarking message, in the case of the module for determining at least one watermarking message, and a suite of estimated-channel parameters, in the case of the module for determining at least one suite of channel parameters.

15. A computer program product embodied in a machine-readable medium, said software product comprising instructions operable to cause one or more data processing apparatus to perform operations comprising:
- a step of determining, by a processor, at least one watermarking message contained in a data set, possibly preceded by a step of determining at least one suite of parameters of a watermarking channel undergone by said data set, each suite of channel parameters comprising at least one channel parameter, wherein said step of determining at least one watermarking message and said prior step of determining at least one suite of channel parameters comprises (comprise):
- an estimation phase, consisting in processing at least one batch of data comprising data of said data set, so as to obtain N estimated element(s), with $N \geq 0$; and
- a verification phase, consisting in validating or invalidating, in view of the entirety or of at least a subset of said data set, each estimated element
- where each estimated element is an estimated watermarking message, in the case of said step of determining at least one watermarking message, and a suite of estimated-channel parameters in the case of said prior step of determining at least one suite of channel parameters.

* * * * *